Sept. 5, 1933.     E. L. FICKETT     1,925,528
SPIRAL BEVEL GEAR CUTTER
Filed Oct. 21, 1929

INVENTOR
Ernest L. Fickett
ATTORNEY

Patented Sept. 5, 1933

1,925,528

UNITED STATES PATENT OFFICE 1,925,528

SPIRAL BEVEL GEAR CUTTER

Ernest L. Fickett, Fitchburg, Mass., assignor to Manning, Maxwell & Moore, Inc., New York, N. Y., a corporation of New Jersey Application October 21, 1929. Serial No. 401,024

3 Claims. (Cl. 29—103)

The present invention has for an object to provide an improved apparatus for cutting spiral bevel gears.

Spiral bevel gears may be so cut that the teeth are of uniform cross-section from end to end with tapering spaces therebetween, they may be so cut that the spaces are of uniform cross-section from end to end with the teeth tapering or they may be so cut that the teeth and spaces taper to the same extent. The present invention provides an apparatus and a method whereby the gears may be cut with the teeth and spaces both tapering, the apparatus being of such a character that the gears may be cut expeditiously and economically.

The nature and objects of the invention will be better understood from a consideration of a particular illustrative embodiment thereof for the purpose of which description reference should be had to the accompanying drawing forming a part hereof and in which—

Figure 1:
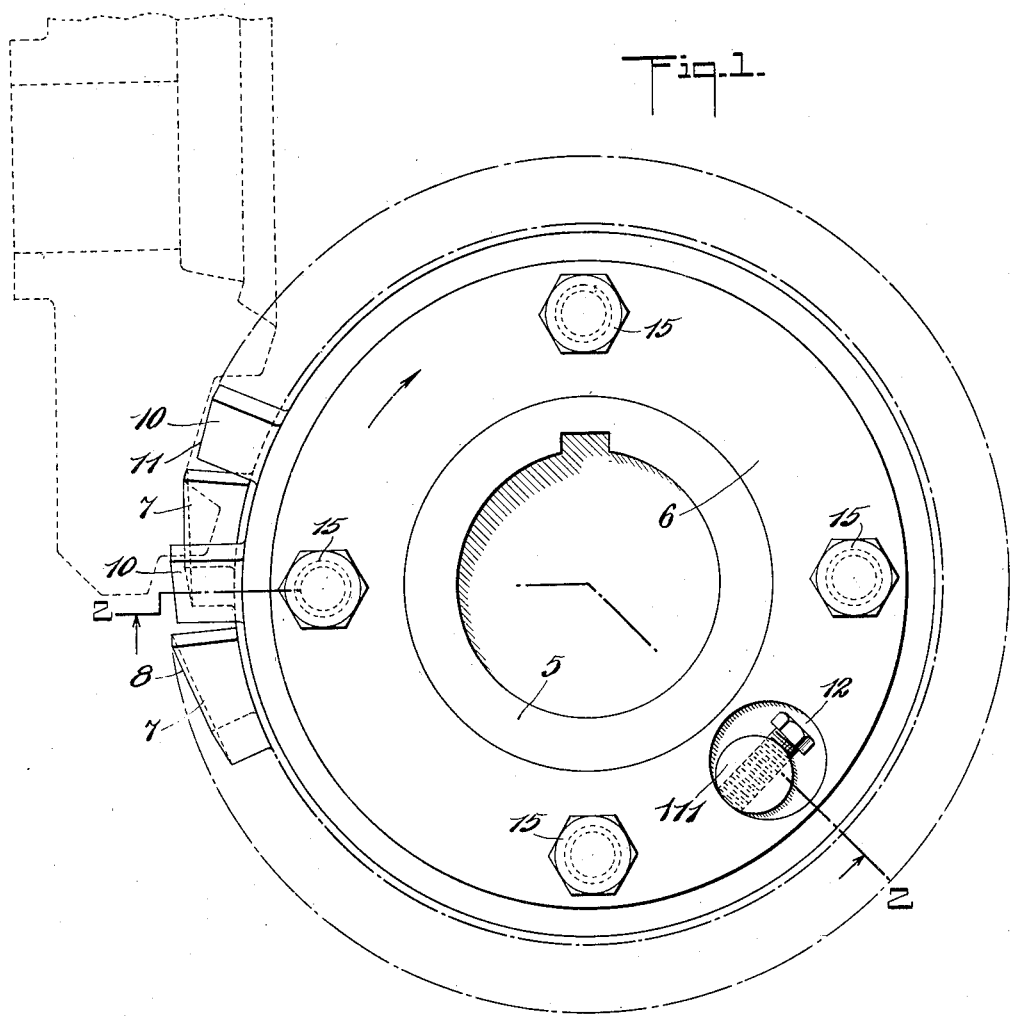
Figure 2:
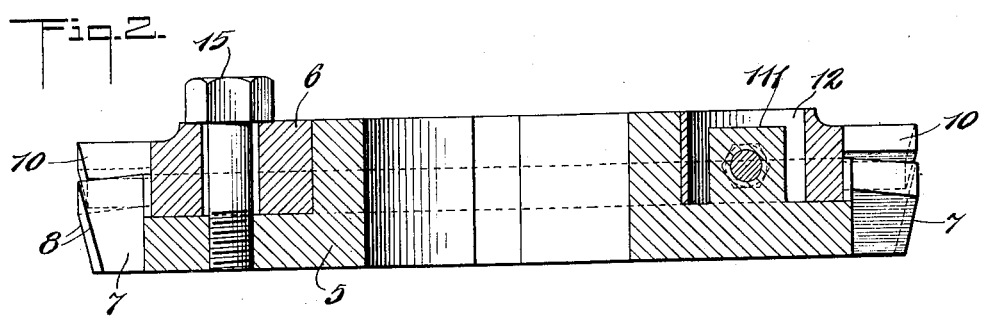
Figure 3:
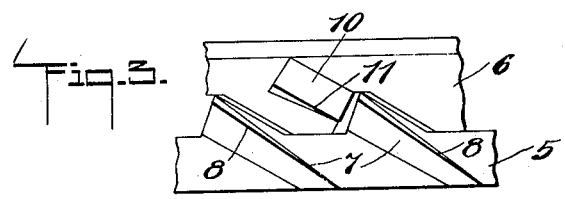

Figure 1 is a side view of a cutter for cutting spiral bevel gears constructed in accordance with the invention, Fig. 2 is an edge view partly in section on the line II—II of Figure 1, and Fig. 3 is a detail edge view indicating the arrangement of the teeth.

The cutter is shown in operative relation to a spiral bevel gear. In the operation of cutting the spiral bevel gear, the gear cutter is fed along the face of the blank in a direction substantially parallel to an element of the pitch cone of the blank, the cutter and blank being simultaneously rotated at a speed determined by the relative numbers of teeth and the rate of feed.

The gear cutter shown for the purposes of illustrating the principles of the invention comprises two parts adjustable relative to each other, one part carrying cutting edges adapted to cut one face of each tooth of the gear to be cut and the other part carrying cutting edges adapted to cut the other face of each tooth. As shown, the cutter part 5 is formed with a circular shoulder to receive the cutter part 6 which is rotatably adjustable thereon. The part 5 carries outwardly projecting teeth 7, the cutting edges 8 of which are adapted to generate one face of each tooth of a spiral bevel gear being cut by the cutter and the part 6 carries a set of teeth 10, the cutting edges 11 of which are adapted to generate the opposite face of each tooth. It will be noted that the cutting edges all lie in substantially the same transaxial plane, but are somewhat inclined to that plane. The compromise of the inclination is made to obtain the desired tooth angle and is found not to introduce objectionable error. Satisfactory results are obtained if the points of the teeth lie in the same plane.

Adjustment of the part 6 rotatably on the part 5 may be accomplished by means of an adjusting screw extending through a stud 111 which projects from the base member 5 through an aperture 12 in the section 6. The two parts are held securely in adjusted position by tightening the bolts 15.

The cutter shown is designed to cut both faces of each tooth of a spiral bevel gear by a movement along an axial plane of the gear in a manner to produce Archimedian spiral teeth but if an involute curve or some other curve is desired suitable changes can be made.

In the particular structure shown, the cutting edges lie substantially in a transaxial plane, that is to say in a plane at right angles to the axis of the rotatable cutter but it will be understood that these cutting edges might operate effectively in a surface of revolution not a plane, it being sufficient if both cutting edges of each tooth operate substantially in the same surface of revolution so that both cutting edges will be suitably related to the blank during the cutting operation to generate the same spiral curve along the pitch cone of the blank.

The foregoing particular description is illustrative merely and is not intended as defining the limits of the invention.

I claim:

1. A cutter for cutting spiral bevel gears comprising relatively adjustable parts, each carrying cutting edges angularly disposed across its periphery for cutting one side of the teeth of a spiral bevel gear, said parts being relatively adjustable to vary the angular relation of the cutting edges to determine the width of the tooth spaces cut thereby.

2. A rotatable cutter for cutting spiral bevel gears comprising a pair of disk-like members adapted to be clamped together, each of said members having cutting teeth projecting radially from its periphery, the teeth of one member being in juxtaposition to the teeth of the other member, said members being angularly adjustable with relation to each other to vary the angular relation of the cutting edges and thereby the width of the tooth spaces cut.

3. A rotatable cutter for cutting spiral bevel gears comprising a pair of disk-like members adapted to be clamped together, said members having radially extending cutting teeth at their peripheries, the teeth of one member being adjacent and in angular relation to the teeth of the other member, and said members being adjustable to vary the angular relation of the cutting edges of said teeth and thereby vary the width of the tooth spaces cut.

ERNEST L. FICKETT.